United States Patent [19]

Graham et al.

[11] Patent Number: 4,803,019
[45] Date of Patent: Feb. 7, 1989

[54] PROCESS FOR FORMING A LINER AND CAST PROPELLANT CHARGE IN A ROCKET MOTOR CASING

[75] Inventors: William H. Graham, Huntsville; Kenneth E. Bevel, Grant; James D. Byrd, Huntsville; Kenneth E. Junior, Madison; Inella G. Shepard, Huntsville, all of Ala.

[73] Assignee: Morton Thiokol, Inc., Chicago, Ill.

[21] Appl. No.: 579,222

[22] Filed: Feb. 10, 1984

[51] Int. Cl.$^4$ ............................................. C06B 21/00
[52] U.S. Cl. .................................. 264/3.1; 102/290; 149/19.4; 149/19.9; 149/19.92
[58] Field of Search ................... 149/19.4, 189, 19.92; 102/290; 264/3 R, 3.1

[56] References Cited

U.S. PATENT DOCUMENTS

| | | | |
|---|---|---|---|
| 3,046,829 | 7/1962 | Roemer | 264/3 R |
| 3,188,962 | 6/1965 | Mosher | 102/290 |
| 3,433,158 | 3/1969 | Pierce | 102/290 |
| 3,798,090 | 3/1974 | Allabashi | 149/19.4 |
| 4,021,514 | 7/1977 | Daume | 149/19.4 |
| 4,098,626 | 7/1978 | Graham et al. | 149/19.9 |
| 4,337,218 | 6/1982 | Byrd et al. | 264/3 R |
| 4,429,634 | 2/1984 | Byrd et al. | 102/290 |
| 4,601,862 | 7/1986 | Byrd et al. | 264/3.1 |

Primary Examiner—Edward A. Miller
Attorney, Agent, or Firm—George Wheeler; Gerald K. White

[57] ABSTRACT

Process for forming a liner and cast propellant charge in a rocket engine casing without separately precuring the liner, comprising the steps of providing a blocked curable liner composition which is the reaction product of a prepolymer, an isocyanate curing agent, and a blocking agent; applying the liner composition to an internal surface of a rocket casing; preheating the casing and liner assembly to simultaneously prepare the assembly for receiving a propellant, unblock the liner, and precure the liner to a tacky state; casting the propellant change into interfacial contact with the liner; and cocuring the liner and propellant compositions. The blocked, curable liner composition has a very long pot life which is terminated by heating the composition sufficiently to uncouple the blocking agent from the isocyanate curing agent and initiate a rapid cure. The liner composition does not require precuring, as it is unblocked by preheating the liner and rocket casing sufficiently to receive to cast propellant. The blocked liner composition has the following structure.

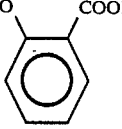

(5)

6 Claims, 1 Drawing Sheet

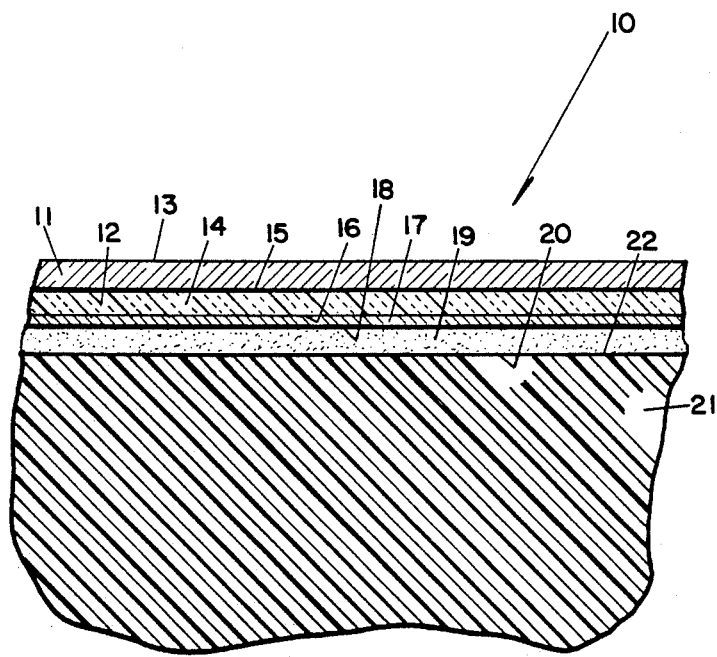

PROCESS FOR FORMING A LINER AND CAST PROPELLANT CHARGE IN A ROCKET MOTOR CASING

BACKGROUND OF THE INVENTION

Rocket motors employing solid propellants typically comprise a rigid outer casing or shell; a heat insulating layer (insulation) bonded to all or part of the inner surface of the casing; a liner layer (liner) bonded to the insulating layer; and a solid propellant bonded to the liner. The insulation is generally fabricated from a composition capable of withstanding the high-temperature gases produced when the propellant burns, thus protecting the casing (or selected parts of it). The liner is an elastomeric composition which bonds the solid propellant to the insulation and casing.

The known process of making a rocket motor typically comprises the following steps:
(1) cleaning and degreasing the inner surface of the rocket motor casing;
(2) applying insulation to selected parts of the inner surface of the casing;
(3) curing and baking out the insulation;
(4) applying a bond promoter (primer) to the inner surface of the insulation and any exposed portion of the casing;
(5) applying the liner over the entire internal surface of the casing, including the insulated areas;
(6) partially curing (also known as precuring) the liner;
(7) placing the lined motor in a propellant casting pit and heating the casing containing the precured liner to an appropriate temperature for casting;
(8) casting the propellant into the lined, heated casing; and
(9) fully curing the propellant and liner, generally by heating the motor assembly.

The prior art process has the disadvantage that steps (6) and (7) above must be performed separately. Step (6) has typically required a cure time of 16 to 24 hours at 170° F. (77° Celsius), and step 7 has typically required bringing the casing and liner to a temperature of about 145° F. (63° Celsius) to initiate the propellant cure as oon as the propellant is poured into the motor. Furthermore, once step 6 has been performed, steps 7 and 8 must follow in a short time to avoid overcuring the liner before the propellant is cast. Finally, because steps 7 and 8 are typically performed under vacuum and step 6 is not, step 6 is carried out in a different location to avoid tying up vacuum-equipped casting pits during a lengthy liner precuring operation.

Improvements in propellant processing taught in U.S. Pat. No. 4,110,135, issued to Graham et al., reduce the propellant cure time and increase its pot life. Thus, the propellant can be mixed, stored, and worked for relatively long periods of time without prematurely curing, but once the cure is initiated it proceeds rapidly to completion. Graham, et al. achieve these advantages by using a propellant binder system comprising hydroxyl-terminated polybutadiene based polyurethane (the reaction product of a hydroxyl terminated polybutadiene prepolymer and a polyisocyanate curing agent) and a curing catalyst comprising an organometallic compound and a carboxylic acid. (The carboxylic acid can optionally be formed in situ).

The same inventors, in U.S. Pat. No. 4,098,626, issued July 4, 1978, have disclosed that salicylate esters can reversibly block tertiary polyisocyanate curing agents which copolymerize with hydroxyl-terminated, polybutadiene based polyurethane propellant binders. The blocks are reversed by preheating the binder to its usual cure temperature, whereupon curing proceeds at a normal rate. But U.S. Pat. No. 4,098,626 teaches propellant binding compositions, not liners. One important difference between liner curing and propellant binder curing is that the latter operation is performed in a single step, while liner curing has required two steps (6 and 9 above). Another important difference between propellant and liner processing is that the temperature of a body of propellant cannot be rapidly and uniformly changed by changing the ambient temperature, while a liner is applied as a very thin coating on the exposed interior surface of a casing, so its temperature responds rapidly to changes in ambient temperature. The propellant art thus does not suggest the possibility of rapidly arresting or triggering a liner curing process by changing the ambient temperature. U.S. Pat. No. 4,098,626 is hereby incorporated by reference.

SUMMARY OF THE INVENTION

One aspect of the invention is a process for lining a rocket motor and casting a propellant charge within and in interfacial contact with the lining, comprising the steps of:
a. providing a rocket casing having an internal surface;
b. providing a blocked curable liner composition which is the reaction product of a prepolymer, an isocyanate curing agent, and a blocking agent;
c. applying the liner composition to the internal surface of the rocket casing, forming a casing and uncured liner assembly;
d. providing an uncured, castable propellant composition;
e. preheating the casing and uncured liner assembly for receiving the propellant, which simultaneously unblocks the liner and precures it to a tacky state;
f. casting the propellant into interfacial contact with the precured liner; and
g. cocuring the liner and propellant compositions.

The recited process provides several advantages in the production of rocket motors. First, the separate step of precuring the liner for a substantial time prior to loading the propellant can be eliminated. Thus, time and energy are saved and a more rapid and more controlled precure of the liner is possible. Second, the invention allows the cure rate of the liner to be coordinated with the cure rate of the propellant, promoting interfacial crosslinking between the propellant and liner. This advantage is particularly pronounced when the propellant contains a binder system selected from those described in U.S. Pat. No. 4,098,626.

A second aspect of the invention is a method of arresting the liner curing process after the liner is precured and before the propellant grain is cast and cured. In this process a liner including blocked isocyanates is applied and precured in the usual manner, then the curing of the liner is deliberately arrested by reducing its ambient temperature substantially, preferably from a precuring temperature (between about 145° F. and 170° F.) at which isocyanates in the liner are substantially unblocked to a holding temperature of less than 100° F. (38° C.), and preferably 77° F. or less, at which isocyanates in the liner are substantially blocked. The liner cure is then restarted after a desired length of time has elapsed by increasing the ambient temperature surrounding the liner to substantially unblock its isocyanate constituents. The desired holding time can be from about 1 to about 480 hours.

The invention also includes lining compositions which include the components and have the advantages described previously.

BRIEF DESCRIPTION OF DRAWING

The FIGURE is a fragmentary longitudinal section of a rocket motor made according to the process of the present invention.

DETAILED DESCRIPTION OF THE INVENTION

Referring first to the FIGURE, rocket motor 10 comprises a casing 11 having inner and outer surfaces 12 and 13. If desired, insulation 14 is applied in well known fashion by joining its outer surface 15 to at least a portion of inner surface 12. A primer 17 is applied to inner surface 16 of insulation 14, then a liner 19 is applied to surface 18 of primer 17 and precured. A propellant grain 21 is cast with its outer surface 22 in interfacial contact with inside surface 20 of liner 19. The liner and propellant are then cocured. It will be understood that the FIGURE is not drawn to scale, and the shapes of the several components can vary, depending upon the design of the motor. The composition and manner of applying and curing insulation 14 and primer 17 is known to the art, and is not further discussed herein.

Lining compositions useful herein comprise the reaction product of a prepolymer which is terminated with functional groups which react with an isocyanate, a diisocyanate or polyisocyanate curing agent which will react with the prepolymer to form a urethane or analogous linkage, and a blocking agent which is temporarily linked to at least some isocyanate moieties of the curing agent to reversibly inhibit polymerization. A curing catalyst, bond promoters, one or more fillers, and other optional ingredients may be added to the reaction product. The nature of each ingredient of the lining composition is discussed below.

PREPOLYMER

The prepolymers useful herein are organic compounds having at least two active hydrogen providing moieties, preferably hydroxyl or thiol moieties, capable of reacting with a polyisocyanate to form urethane or thiourethane linkages.

The preferred prepolymers are compounds having the general formula:

$$HO-R^1-OH$$

wherein $R^1$ is a divalent organic radical. The hydroxyl groups may be of any type suitable for forming urethane linkages with isocyanate groups such as, for example, alcoholic or phenolic hydroxyl groups. The following dihydroxyl compounds are illustrative of compounds suitable as reactants in this invention:

(a) Alkane diols having a chain length of from 2 to 20 carbon atoms inclusive such as:
2,2-dimethyl-1,3-propanediol;
Ethylene glycol;
Tetramethylene glycol;
Hexamethylene glycol;
Heptamethylene glycol;
Decamethylene glycol;
and the like;
(b) Alkane diols, such as:
1-propylene-1,2-diol;
2-propylene-1,3-diol;
1-butylene-1,2-diol;
3-butylene-1,2-diol;
1-hexylene-1,3-diol;
1-butylene-2,3-diol;
and the like;
(c) Cycloalkylene diols, such as:
Cyclopentylene-1,3-diol;
Cyclohexylene-1,2-diol;
Cyclohexylene-1,3-diol;
Cyclohexylene-1,4-diol;
and the like;
(d) Carbocyclic aromatic diols, such as:
Catechol;
Resorcinol;
Quintol;
1-methylbenzene-2,4-diol;
2-methylnaphthalene-1,3-diol;
Toluene-3,4-diol;
Xylene-1,4-diol;
Xylene-1,3-diol;
1,5-di(hydroxymethyl)naphthalene;
2-ethyl-1-phenyl-3-butene-1,2-diol;
2,2-di(hydroxyphenyl)propane;
and the like;
(e) Diols containing hetero atoms, such as:
Di-(beta-hydroxyethyl)ether;
6-methylpyrimidine-2,4-diol;
$HO-CH_2-CNH(CH_2)_4NHCH_2OH$;
Bis-(beta-hydroxyethyl)formal;
Dithiodiglycol;
and the like; and
(f) Hydroxyl-terminated polybutadienes, for example the materials solid by Arco Chemical Company, Philadelphia, Pa. under the designations R-45M and R-45HT.

Also included among the polyfunctional polyols suitable as reactants in the invention are polyalkylene ethers, thioethers, and ether-thioether glycols represented by the general formula:

$$HO-(RX)_m-H$$

wherein R represents the same or different alkylene radicals containing up to about 19 carbon atoms, X represents oxygen or sulfur, and m is an integer large enough that the molecular weight of the polyalkylene ether, thioether, or ether-thioether glycol is at least about 400 atomic mass units, for example, from about 400 to about 10,000 atomic mass units. The preferred polyalkylene ether glycols included within this general formula are polyethylene glycols, polypropylene glycols, polybutylene glycols, polytetramethylene glycols, polyhexamethylene glycols and the like. These preferred polyalkylene glycols are obtained, for example, by acid-catalyzed condensation of the corresponding monomeric glycols or by the condensation of lower alkylene oxides, such as ethylene oxide, propylene oxide, and the like, either with themselves or with glycols such as ethylene glycol, propylene glycol, and the like. One commercial material useful herein is POLYMEG 2000, a polytetramethylene ether glycol having a molecular weight of about 2000 atomic mass units, available from Quaker Oats Company, Chicago, Ill. (Herein-after, all atomic weights are expressed in atomic mass units unless otherwise specified).

Polyalkylenearylene ether, thioether and ether-thioether glycols may also be employed as polyol reactants. These materials also have molecular weights ranging from about 400 to about 10,000, but further include arylene radicals such as phenylene and naphthylene optionally substituted with alkyl groups, aryl groups, or the like, in place of some of the alkylene radicals of the polyalkylene glycols previously discussed. These polyalkylenearylene glycols will usually contain at least one alkylene ether radical having a molecular weight of about 500 for each arylene radical present.

Essentially linear polyesters containing a plurality of isocyanate-reactive hydroxyl groups constitute another class of reactive organic polyfunctional polyols which may be employed in preparing polyurethanes useful in the present invention. While the preparation of polyesters suitable for this purpose has been described in great detail in the prior art and is not part of the present invention, polyesters of this type typically can be prepared by condensing a polyhydric alcohol with a polycarboxylic acid or anhydride.

Polyhydric alcohols useful herein are generally saturated aliphatic diols such as ethylene glycol; propane-1,2-diol; propane 1,3-diol; butane-1,3-diol; butane-1,4-diol; pentane-1,2-diol; pentane-1,5-diol; neopentyl glycol; hexane-1,3-diol; hexane-1,6,-diol; diethylene glycol; dipropylene glycol; triethylene glycol; tetraethylene glycol; mixtures of such diols with each other and with minor amounts of polyols having more than two hydroxyl groups, preferably saturated aliphatic polyols such as glycerol, trimethylolethane, trimethylolpropane, pentaerythritol, sorbitol, and the like.

Polycarboxylic acids or anhydrides useful herein are generally dicarboxylic acids or anhydrides which are saturated or contain only benzenoid unsaturation, such as oxalic, malonic, succinic, glutaric, adipic, pimelic, suberic, azelaic, sebacic, malic, phthalic, cyclohexanedicarboxylic, and endomethylenetetrahydrophthalic acids, their isomers, homologs, and other substituted derivatives (e.g. halogen derivatives), or mixtures of such acids with each other and with unsaturated dicarboxylic acids or anhydrides such as maleic, fumaric, citraconic, and itaconic acids, and the like, as well as polycarboxylic acids containing three or more carboxyl groups such as aconitic acid and the like.

The essentially linear polyesters commonly used in preparing polyurethane resins preferably have molecular weights ranging from about 750 to about 3,000. In addition, they will generally have relatively low acid numbers, typically not appreciably in excess of about 60 and preferably as low as possible, such as 2 or less. Correspondingly, they will generally have relatively high hydroxy numbers, such as from about 30 to about 700. When preparing these polyesters, an excess of polyol over polycarboxylic acid is generally used to ensure that the resulting essentially linear polyester chains contain a sufficient number of reactive hydroxyl groups.

One example of this class of prepolymers is E-9365 Polymer, a neopentyl glycol azealate sold by Emery Industries, Inc., Cincinnati, Ohio.

Another class of suitable organic polyfunctional polyol reactants include polyalkylene ether polyols containing more than two reactive hydroxyl groups such as polyalkylene ether triols, tetrols, and the like.

These can be prepared by reacting polyols such as glycerol, trimethylolethane, trimethylolpropane, pentaerythritol, dipentaerythritol, sorbitol, and the like with lower alkylene oxides such as ethylene oxide, propylene oxide, and the like.

Nitrogen-containing polyfunctional polyols may also be used as polyol reactants. Among such materials are the polyesteramides conventionally employed in the preparation of polyurethane esins, typically having molecular weights ranging from about 750 to about 3,000, acid numbers less than about 60, preferably 2 or less, and hydroxyl numbers ranging from about 30 to about 700, and also high molecular weight polyamino alcohols, such as hydroxypropylated alkylene diamines of the general formula:

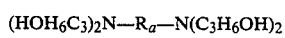

$(HOH_6C_3)_2N-R_a-N(C_3H_6OH)_2$ ($R_a$ represents an alkylene radical having from 2 to 6 carbon atoms). Representative species are N,N,N',N'-tetrakis(2-hydroxypropyl)-ethylenediamine, higher analogs thereof, such as hydroxypropylated polyalkylenepolyamines of the general formula:

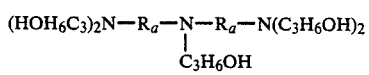

$$(HOH_6C_3)_2N-R_a-N-R_a-N(C_3H_6OH)_2$$
$$\phantom{(HOH_6C_3)_2N-R_a-N}|\phantom{R_a-N(C_3H_6OH)_2}$$
$$\phantom{(HOH_6C_3)_2N-R_a}C_3H_6OH$$

wherein $R_a$ is as defined previously. (See U.S. Pat. No. 2,697,118 to Lundsted et al.)

Polysulfides having two or more thiol groups such as ethylene disulfide and the various well-known liquid polysulfide polymers and polysulfides having glycol end groups, such as those having the general formula:

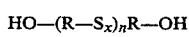

$HO-(R-S_x)_nR-OH$ wherein R is alkylene, arylene, dialkylene formal and the like, x is 2 to 4, and n is a whole number, are other suitable reactants for the invention. Polyisothiocyanate and polythiol analogs of the polyols described herein also react to yield urethane-type products. Consequently, these compounds are deemed equivalents of the polyols disclosed herein, and are within the scope of the invention.

The preferred hydroxyl-terminated prepolymers useful herein are R-45M and R-45HT hydroxyl-terminated polybutadienes; E-9365 polymer; and POLYMEG 2000 all (identified previously).

CURING AGENT

The isocyanates useful as curing agents herein include di- or polyfunctional organic isocyanates which have isocyanate groups as the only groups reactive with the thiol or hydroxyl groups of the selected prepolymer (under the selected reaction conditions). Preferred are diisocyanates, which correspond to the formula:

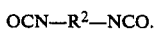

$OCN-R^2-NCO.$

Both alkylene and arylene isocyanates are suitable. Illustrative but not limiting isocyanates are:
(a) Alkane diisocyanates, such as:
Ethylene diisocyanate;
Trimethylene diisocyanate;
Propylene-1,2-diisocyanate;
Tetramethylene diisocyanate;
Butylene-1,3-diisocyanate;

Octadecamethylenediisocyanate;
and the like;
(b) Alkene diisocyanates, such as:
1-propylene-1,2-diisocyanate;
2-propylene-2,3-diisocyanate;
1-butylene-1,2-diisocyanate;
3-butylene-1,2-diisocyanate;
1-butylene-1,3-diisocyanate;
1-butylene-2,3-diisocyanate;
and the like;
(c) Alkylidene diisocyanates, such as:
Ethylidene diisocyanate;
Propylidene-1,1-diisocyanate;
Propylidene-2,2-diisocyanate;
and the like;
(d) Cycloalkylene diisocyanates, such as:
Cyclopentylene-1,3-diisocyanate;
Cyclohexylene-1,3-diisocyanate;
Cyclohexylene-1,2-diisocyanate;
Cyclohexylene-1,4-diisocyanate;
and the like;
(e) Cycloalkylidene diisocyanates, such as:
Cyclopentylidene diisocyanate;
Cyclohexylidene diisocyanate;
and the like;
(f) Carbocyclic aromatic diisocyanates, such as:
m-Phenylene diisocyanate,
o-Phenylene diisocyanate;
p-Phenylene diisocyanate;
1-methyl-2,4-phenylene diisocyanate;
Naphthylene-1,4-diisocyanate;
Diphenylene-4,4'-diisocyanate;
Tolylene-2,4-diisocyanate;
Tolylene-2,6-diisocyanate;
Naphthylene-1,5-diisocyanate;
Methylene-bis-(phenyl-4-isocyanate);
Xylylene-1,4-diisocyanate;
Xylylene-1,3-diisocyanate;
4,4'-diphenylene propane diisocyanate;
and the like;
(g) Diisocyanates containing heteroatoms, such as:
Di(beta-isocyanato)ethyl ether;
Pyridine-2,3-diisocyanate;
and the like;
(h) Other diisocyanates containing various non-reactive substituents, such as:
1-chlorophenyl-2,4-diisocyanate;
1-nitrophenyl-2,4-diisocyanate;
1,3-dichlorophenyl-4,6-diisocyanate;
1,4-dichlorophenyl-2,5-diisocyanate;
1-chloro-4-methoxyphenyl-2,5-diisocyanate;
1-methoxyphenyl-2,4-diisocyanate;
1-methyl-4-methoxyphenyl-2,5-diisocyanate;
1-ethoxyphenyl-2,4-diisocyanate;
1,3-dimethoxyphenyl-4,6-diisocyanate;
1,4-dimethoxyphenyl-2,5-diisocyanate;
1-propoxyphenyl-2,4-diisocyanate;
1-isobutoxyphenyl-2,4-diisocyanate;
1,4-diethoxyphenyl-2,5-diisocyanate;
and the like; and
(i) Other polyisocyanates, represented by:
Diphenylether-2,4-diisocyanate;
1,1-dinaphthalene-2,2'-diisocyanate;
3,3'-dimethylbiphenyl-4,4'-diisocyanate;
3,3'-dimethoxybiphenyl-4,4'-diisocyanate;
3,3'-dimethoxydiphenylmethane-4,4'-diisocyanate;
Benzophenone-3,3'-diisocyanate;
3-butoxyhexamethylene diisocyanate;
1,2-dimethylcyclohexane diisocyanate;
1,4-dimethylnaphthalene diisocyanate;
1,5-dimethylnaphthalene diisocyanate;
Dicyclohexylmethane-4,4'-diisocyanate;
Dicyclohexylmethylmethane-4,4'-diisocyanate;
(4,4'-diisocyanato)dicyclohexyldimethylmethane;
2,2'-dimethyldicyclohexylmethane-4,4'-diisocyanate;
3,3',5,5'-tetramethyldicyclohexylmethane-4,4'-diisocyanate;
Dicyclohexyldimethylmethane-4,4'-diisocyanate;
3-nitrotriphenylmethane-4,4'-diisocyanate;
Pyrene-3,8-diisocyanate;
Chrysene-2,8-diisocyanate;
Dianisidine diisocyanate;
4,4'-diphenyl ether diisocyanate;
Isopropylidene bis(phenyl isocyanate);
Isopropylidene bis-(cyclohexyl isocyanate);
Chlorodiphenyl diisocyanate;
4,4',4''-triphenylmethane triisocyanate;
1,3,5-triisocyanatobenzene;
Phenylethylene diisocyanate.

One commercially available curing agent for use herein is toluene-2,4-diisocyanate. Another commercial curing agent is DDI DIISOCYANATE, consisting of a complex mixture of isomers, available from Henkel Corporation, Kankakee, Ill. Other commercial curing agents useful herein include IPDI (isopropyl diisocyanate) available from Thorsen Chemical Company, New York City, N.Y.; HYLENE W, sold by E. I. DuPont de Nemours & Co., Wilmington, Del.; DESMODUR N-100, a trifunctional isocyanate sold by Mobay Chemical Corp., Pittsburgh, Pa.; HMDI (hexamethylene diisocyanate), sold by Mobay Chemical Corp., Pittsburgh, Pa.; and DMDI (dimethylene diisocyanate), sold by DuPont.

BLOCKING AGENT

Blocking agents useful herein are selected from salicylate esters having the formula:

(2)

wherein $R^3$ is selected from lower alkyl radicals having from 1 to about 10 carbon atoms or carbocyclic aryl radicals having from 6 to about 10 carbon atoms. A preferred species for use herein is n-octyl salicylate. Other species useful herein are isopentyl salicylate and 2-ethylhexyl salicylate. Another class of blocking agents useful herein is represented by p-nitrophenol.

BLOCKING AND UNBLOCKING REACTION

From about 0.1 to about 1.2 equivalents of the selected prepolymer, from about 0.9 to about 1.6 equivalents of the selected curing agent, and from about 0.1 to 1.0 equivalents of the blocking agent are reacted to form a blocked, curable lining constitutent in two steps. First, the blocking agent (1) is reacted with the curing agent (2), as follows:

(1)

-continued

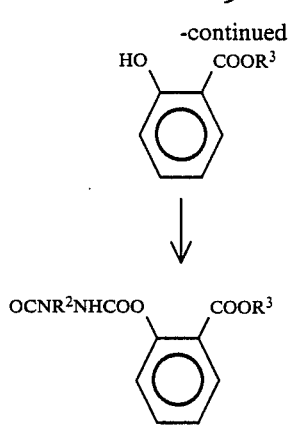

The resulting partially blocked curing agent, (3), is then reacted with each equivalent of the selected prepolymer:

$$HO-R^1-OH \quad (4)$$

to produce a blocked, curable liner constituent having the structure:

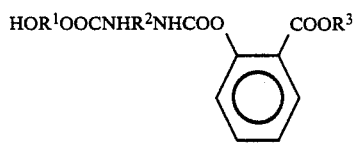

Constituent (5) will polymerize very slowly, if at all, at room temperature. However, it is easily unblocked by heating it to about 60 degrees Celsius, thereby splitting (2) from (5) by reversing the reaction shown in (1)–(3) above. The resulting, readily polymerizable product is:

Compound (6) polymerizes in head-to-tail fashion by reaction of the isocyanate moiety of one molecule with the hydroxyl moiety of another to form a polyurethane polymer. The residual amount of (2) remaining in the cured liner does not harm it, and typically acts as a plasticizer.

The unblocking reaction can be slowed down, or even reversed to reblock the isocyanate, by reducing the ambient temperature around the casing. Consequently, the curing process can be arrested when the liner is precured.

CATALYSTS

While not all compositions or processes taught herein require them, a catalyst for unblocking the liner constituent (5) or polymerizing the unblocked liner constituent (6) can be incorporated with the blocked constituent material (5). The catalyst remains dormant until the composition is heated to unblock the liner constituent. The preferred catalysts hasten curing after the block is removed but do not significantly affect the pot lives of the blocked constituents taught herein.

Any organometallic compound of the general formula $MR_m$, where M is an m-valent metal such as bismuth, lead, tin arsenic, zinc, copper, cadmium, potassium and the like, and R is selected from alkyl or aryl groups such as phenyl, tolyl, benzyl, naphthyl, alkyl of 1 to 20 carbon atoms, or cycloalkyl of 5 to 20 carbon atoms such as methyl, ethyl, hexyl, cyclopentyl, methyl cyclohexyl, and the like has utility herein as a catalyst.

Other categories of catalysts useful herein are tertiary amines, maleic anhydride, and magnesium oxide. Still other suitable unblocking catalysts useful herein are characterized in U.S. Pat. No. 3,705,119, issued to Levy, et al. on Dec. 5, 1972, incorporated herein by reference.

Specific catalysts useful herein include the following:
Lead acetyl acetonate;
Copper stearate;
Dibutyl tin diacetate;
Calcium 2-ethylhexanoate;
Triethylamine;
Ferric acetyl acetonate;
Dibutul tin dilaurate;
Triphenyl bismuth; or
Iron linoleate.

The preferred catalyst for a delayed quick cure is a mixture of triphenyl bismuth, maleic anhydride, and magnesium oxide.

OTHER ADDITIVES

In addition to the previously described ingredients of liner compositions useful herein, any of the usual additives, such as plasticizers, fillers, coloring agents, reinforcing agents, and the like may be incorporated in the liner composition. To encourage bonding between the propellant and liner and between the liner and primed casing or insulation, bond promoters can be added to the liner compositions. Some exemplary bond promoters are HX-868, a trifunctional aziridine commercially available from 3M Company, St. Paul, Minn.; tris(1-(2-methyl)aziridinyl)-phosphine oxide, sold under the trademark MAPO by Inmont Corporation, New York City, N.Y.; EPON-828 (bisphenol A diepoxide), commercially available from Shell Chemical Company, Houston, Tex.; and dihydroxyethyldimethylhydantoin, sold as DANTOCOL DHE by Glyco Chemicals, Inc., Greenwich, Conn.

PROCESS CONSIDERATIONS

The temperature employed in liner blending and fabrication will desirably be low enough to assure that the cure reaction is not prematurely accelerated but high enough to maintain all ingredients in a homogeneous liquid state with a low enough viscosity to permit mechanical transfer and application. Once the liner is in place, curing should be allowed to proceed at a high enough temperature to promptly precure and cure the liner. However, if the cure proceeds at an excessive temperature, distortion of the cured liner or propellant (due to intended thermal stresses) may occur, or the temperatures of some parts of the liner and propellant may vary, resulting in an irregular cure. Thus, the preferred precuring and curing temperature for use herein is from about 145° to about 170° Fahrenheit (63° to 77° Celsius).

EXAMPLE I

Preparation of Liner Compositions

Liner compositions having the composition set forth in Table I are prepared; all quantities in Table I are percent by weight.

TABLE I

PART 1

| Material | FORMULATION | | |
|---|---|---|---|
| | TL-Q703A | TL-Q704A | TL-Q705A |
| E-9365 Polymer | 46.33 | — | — |
| POLYMEG 2000 | — | 43.77 | 36.70 |
| R-45M | — | — | — |
| toluene diisocyanate | 5.29 | 4.19 | — |
| DDI diisocyanate | — | — | 10.56 |
| Isopropyl diisocyanate | — | — | — |
| DESMODUR N-100 | — | — | 1.73 |
| n-octylsalicylate | 8.38 | 12.04 | 11.01 |
| triethylamine | — | — | — |
| HX 868 | — | — | — |
| Carbon Black | 40.00 | 40.00 | 40.00 |
| TOTAL | 100.00 | 100.00 | 100.00 |

TABLE I

PART 2

| Material | FORMULATION (PARTS BY WEIGHT) | |
|---|---|---|
| | TL-H757A | TL-H755A (Control) |
| E-9365 Polymer | — | — |
| POLYMEG 2000 | — | — |
| R-45M | 44.865 | 41.85 |
| toluene diisocyanate | 3.120 | — |
| DDI diisocyanate | — | 12.15 |
| Isopropyl diisocyanate | — | — |
| DESMODUR N-100 | — | — |
| n-octylsalicylate | 8.970 | — |
| triethylamine* | 0.045 | — |
| HX 868 | 3.000 | 6.00 |
| Carbon Black | 40.000 | 40.00 |
| TOTAL | 100.000 | 100.00 |

*Catalyst for reaction of isocyanate and blocking agent.

Each formulation is prepared as follows. The diisocyanate and (if applicable) salicylate is mixed in the indicated proportions. Triethylamine (if applicable) is then added dropwise to the bowl as mixing continues. The mixture is then allowed to set for about 30 minutes at about 145° F. (63° C.). One third of the prepolymer is mixed in to disperse the other ingredients, to prevent the uptake of moisture from the atmosphere, and to prevent the formation of crystals. The remaining ingredients are then mixed in. The composition is finally mixed for 30 minutes in a powered vacuum mixer.

EXAMPLE 2

Lining a Rocket Motor

Each material is then used to line an insulated rocket motor as follows. A supply of each uncured liner composition is piped to a spray head which is moved axially relative to the internal surface of a motor and is rotated coaxially with respect to the internal surface of the motor, thereby distributing a uniform coating of each uncured liner composition on the internal surface of a motor. Each coating is about 0.30 inches thick. The liner material is sufficiently thixotropic to remain in place on the surface receiving the spray.

EXAMPLE 3

Direct Precuring

Each motor is precured by placing it in a heated oven maintained at a fixed temperature. When a liner has a Penetrometer hardness of 12.5 mm, precuring is considered complete. The control liner (TL-H755A) requires 16-24 hours to precure at a temperature of 170° F. (77° C.); the TL-H757A blocked isocyanate liner requires 2-3 hours to cure at 170° F. and 6-7 hours at 145° F. (63° C.). Consequently, by selecting an appropriate curing temperature between about 145° F. and about 170° F., a liner according to the invention can be precured in four to six hours, and thus can be precured when it is being brought to casting temperature in the casting pit.

EXAMPLE 4

Delayed Precuring

Two motors are lined according to Example 2, one with control composition TL-H755A and the other with blocked isocyanate composition TL-H757A. The viscosity increases of the two liners compare as follows when they are held at a temperature of 77° F. (25° C.).

TABLE 1

VISCOSITY OF UNCURED LINERS

| Viscosity (Kp) | (Control) TL-H755A | (Blocked) TL-H757A |
|---|---|---|
| 2 | start | 3 hours |
| 4 | 3 hours | 40 hours |
| 6 | 5 hours | 175 hours |
| 8 | 8 hours | 300 hours |
| 10 | 10 hours | 400 hours |
| 12 | 12 hours | 450 hours |

The time required for a liner composition to reach a viscosity of 12 kP is defined here as the composition's pot life. The data of Table 1 shows that the control liner will reach an unmanageably high viscosity unless used to line rocket motors within 12 hours after it is mixed. In contrast, the blocked isocyanate liner can be held much longer before it must be used, as it has a pot life in excess of 400 hours.

EXAMPLE 5

Delayed Curing

Two motors are lined and the liners are precured to a Penetrometer hardness of 12.5 mm according to Example 3. One liner is a control made from composition TL-H755A and the other liner is made from blocked isocyanate composition TL-H757A. Each motor is then stored at 77° F. (25° C.). The blocked isocyanate motor can be stored for more than 480 hours without curing too much to be cocured successfully with the propellant grain. The control motor must receive the propellant grain without about 160 hours to ensure successful cocuring of the propellant and liner. The invention thus allows with precured liners to be held for much longer periods than before without weakening the bond between the liner and the propellant.

What is claimed is:

1. A process for lining a rocket motor and casting a propellant charge within and an interfacial contact with said lining, comprising the steps of:
    a. providing a rocket casing having an internal surface;
    b. providing a blocked curable liner composition which is the reaction product of a prepolymer, an isocyanate curing agent, and a blocking agent;
    c. applying said liner composition to said internal surface, thereby forming a casing and uncured liner assembly;
    d. providing an uncured, castable propellant composition;

e. preheating said assembly, thereby preparing it for receiving said propellant while simultaneously unblocking said liner and precuring said liner to a tacky state;

f. casting said propellant within said precured liner; and g. cocuring said liner and propellant compositions.

2. The process of claim 1, wherein said liner composition comprises from about 0.7 to about 1.2 equivalents of a prepolymer having at least two moieties selected from the group consisting of hydroxy and thiol; from about 0.9 to about 1.6 equivalents of a curing agent selected from the group consisting of difunctional and polyfunctional isocyanates, and from about 0.1 to about 1.0 equivalents of a blocking agent selected from the group consisting of paranitrophenol and salicylate esters having the formula:

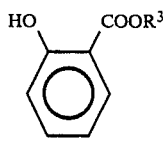 (2)

wherein $R^3$ is selected from alkyl radicals having from one to about 10 carbon atoms or aryl radicals having from 6 to about 10 carbon atoms.

3. The process of claim 2, wherein said liner composition comprises from about 0.7 to about 1.2 equivalents of hydroxyl-terminated polybutadiene, from about 0.9 to about 1.6 equivalents of toluene diisocyanate, and from about 0.5 to about 1.0 equivalents of n-octyl salicylate.

4. A process for arresting the cure of, and subsequently continuing to cure, a precured rocket motor liner, comprising the steps of:

a. providing a blocked curable liner composition comprising a prepolymer, an isocyanate curing agent, and a blocking agent;

b. applying said composition to an interior surface of a rocket motor casing, thereby forming a lined casing;

c. exposing said lined casing to an ambient temperature of from about 145° F. to about 170° F. for a sufficient time to precure said liner composition;

d. exposing said lined casing to an ambient temperature of less than about 100° F., thereby arresting the cure of said liner for a desired period; and e. after said desired period of arrested cure, exposing said liner casing to an ambient temperature of from about 145° F. to about 170° F., thereby continuing to cure said liner.

5. The process of claim 4, wherein, in said Step D, the lined casing is exposed to an ambient temperature of about 77 degrees Fahrenheit.

6. The process of claim 4, wherein, in said Steps D & E, said desired period is from about 1 to about 480 hours.

* * * * *